(12) United States Patent
Buettiker et al.

(10) Patent No.: US 6,830,502 B2
(45) Date of Patent: Dec. 14, 2004

(54) REAMING TOOL WITH A GUIDE SHANK

(75) Inventors: Otto Buettiker, Gunzgen (CH); John Christoffel, Gipf-Oberfrick (CH); Roman Eigenmann, Oftringen (CH)

(73) Assignee: Dihart AG, Dulliken (CH)

( * ) Notice: Subject to any disclaimer, the term of this patent is extended or adjusted under 35 U.S.C. 154(b) by 9 days.

(21) Appl. No.: 10/220,362

(22) PCT Filed: Feb. 17, 2001

(86) PCT No.: PCT/EP01/01772
§ 371 (c)(1),
(2), (4) Date: Nov. 4, 2002

(87) PCT Pub. No.: WO01/64378
PCT Pub. Date: Sep. 7, 2001

(65) Prior Publication Data
US 2003/0143050 A1 Jul. 31, 2003

(30) Foreign Application Priority Data
Mar. 1, 2000 (DE) .......................... 100 09 728

(51) Int. Cl.⁷ ............................................ B23B 31/117
(52) U.S. Cl. ........................... 451/41; 451/540; 408/83; 408/224
(58) Field of Search .................... 451/41, 540, 541, 451/488, 449, 58; 409/233, 239 R, 231, 232; 408/83, 224, 199, 231, 223–225, 143

(56) References Cited

U.S. PATENT DOCUMENTS

| 4,662,803 A | * | 5/1987 | Arnold | 408/224 |
| 5,143,495 A | * | 9/1992 | Bosek | 409/233 |
| 5,342,155 A | * | 8/1994 | Harroun | 409/131 |
| 5,494,382 A | * | 2/1996 | Kloppers | 408/226 |
| 5,595,391 A | * | 1/1997 | Rivin | 279/103 |
| 5,921,727 A | * | 7/1999 | Depperman | 408/144 |
| 5,921,728 A | * | 7/1999 | Kammeraad et al. | 408/227 |
| 5,961,259 A | * | 10/1999 | Ziegler | 408/181 |
| 6,402,438 B1 | * | 6/2002 | Boyer | 408/144 |

FOREIGN PATENT DOCUMENTS

| DE | 14 02 498 | 10/1968 |
| DE | 25 25 163 | 4/1976 |
| DE | 39 05 132 | 11/1989 |
| DE | 42 10 144 | 9/1993 |
| DE | 195 18 241 | 11/1996 |
| DE | 297 20 236 | 3/1998 |
| DE | 197 29 644 | 1/1999 |
| EP | 0 294 348 | 12/1988 |
| EP | 0 504 100 | 9/1992 |

* cited by examiner

Primary Examiner—Joseph J. Hail, III
Assistant Examiner—Anthony Ojini
(74) Attorney, Agent, or Firm—Flynn, Thiel, Boutell & Tanis, P.C.

(57) ABSTRACT

A reaming tool is capable of reaming out several axially interspaced borings of a workpiece. The reaming tool includes a guide shank that can be clamped into a machine spindle and which can be supported in prepared borings of the workpiece to be machined by using external supporting elements. The reaming tool also includes a reaming head coaxially connected on the front end thereof. In order to be able to easily change a worn tool, the reaming head is connected to the guide shank by an auto-centering clamping mechanism. The supporting elements positioned in the proximity of the clamping mechanism can, during a clamping process, be radially spread outwardly from a smaller dimension to a predetermined diameter guide dimension.

16 Claims, 1 Drawing Sheet

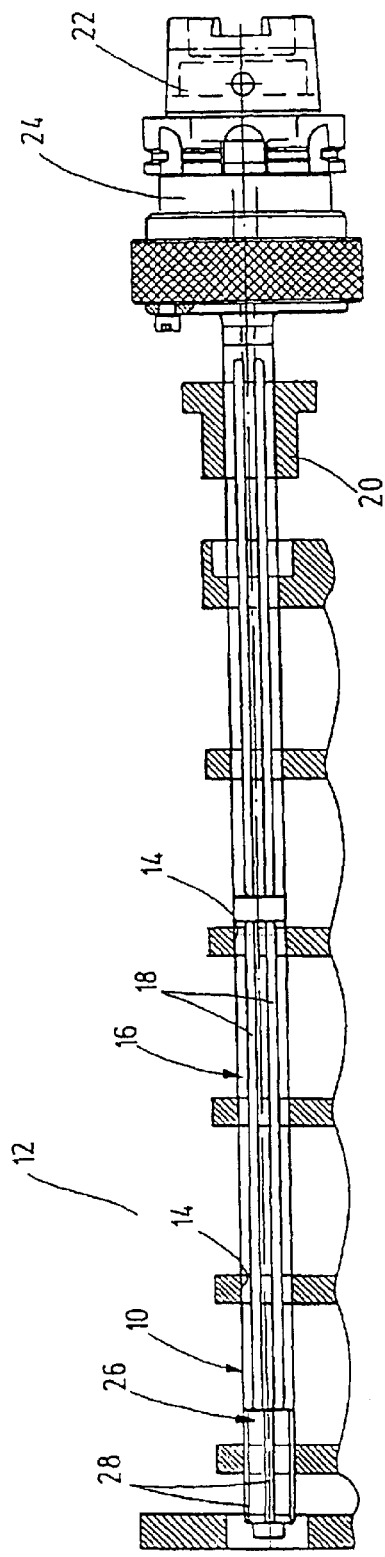
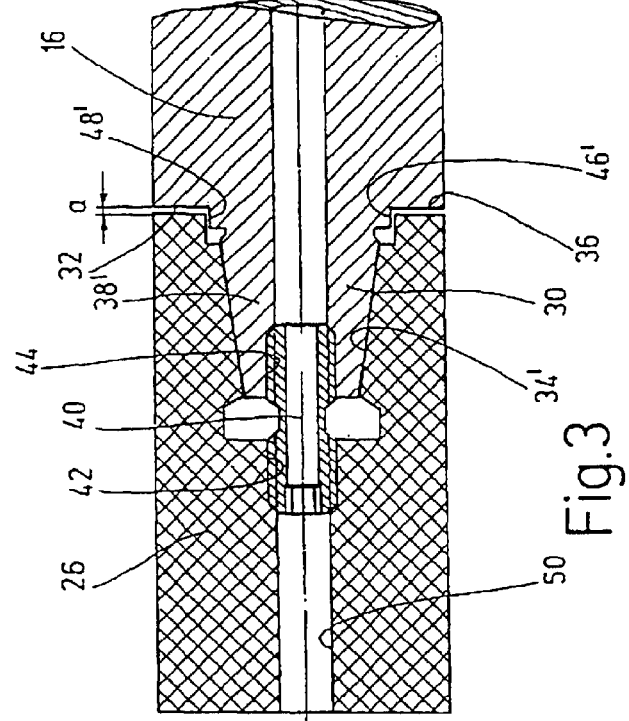
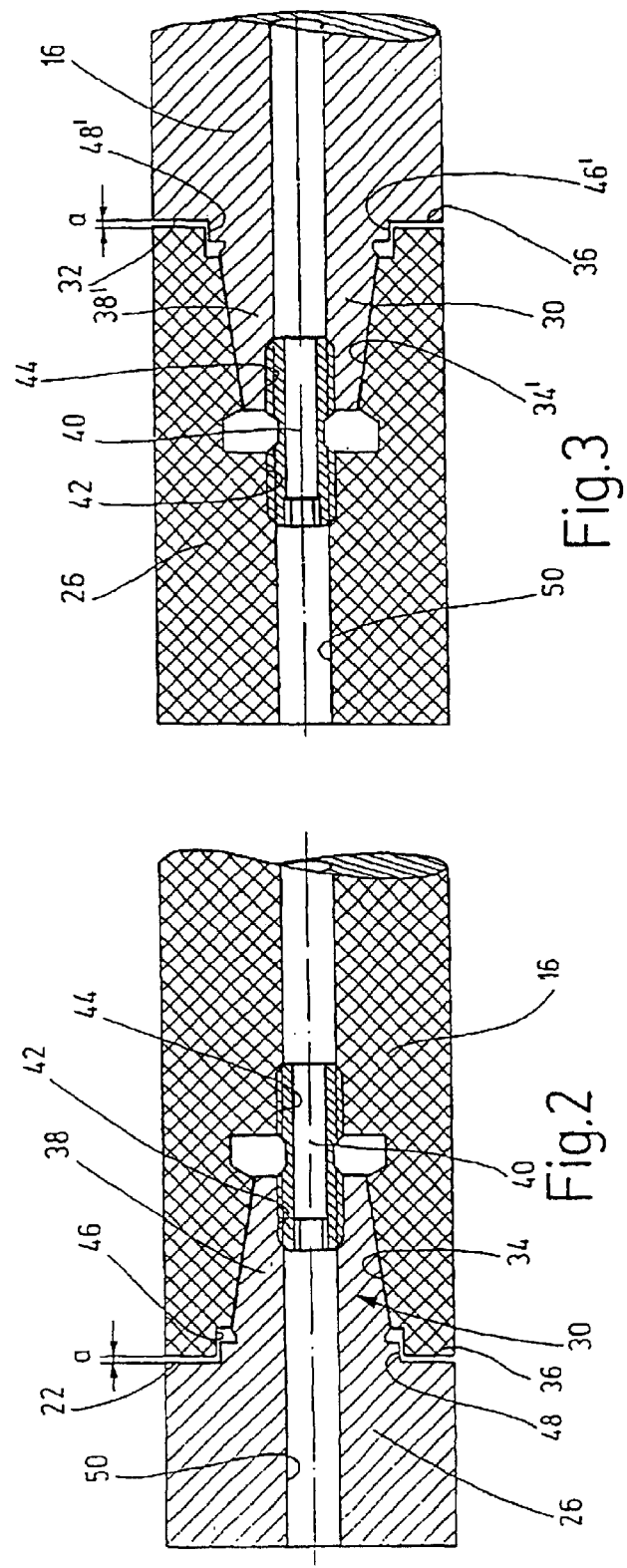
Fig.1
Fig.2
Fig.3

REAMING TOOL WITH A GUIDE SHANK

FIELD OF THE INVENTION

The invention relates to a reaming tool for reaming a plurality of coaxial bores of a workpiece that are arranged at an axial distance from one another. The reaming tool includes a guide shank that can be clamped in place in a machine spindle and supported by external supporting elements in prepared bores of the workpiece to be machined and/or in a guide bush. The reaming tool includes a reaming head coaxially adjoining the front end of the guide shank and provided with cutting edges, and if need be, additional supporting elements.

BACKGROUND OF THE INVENTION

To finish-ream camshaft or crankshaft bearing bores, a reaming tool with a long guide shank, which is supported in the pre-machined bores, is required in order to achieve the requisite alignment. In known reaming tools of this type, the reaming head is connected in one piece with the guide shank. A disadvantage there is that the rework of the cutting edges is relatively expensive. If the cutting edges are worn, the entire tool on the machine has to be exchanged.

Starting herefrom, the object of the invention is to develop a reaming tool having a guide shank of the type mentioned at the beginning, which reaming tool permits a simple change in the event of wear.

The features specified in claim 1 are proposed in order to achieve this object. Advantageous configurations and developments of the invention follow from the dependent claims.

SUMMARY OF THE INVENTION

According to a second embodiment variant of the invention, it is proposed, for the purpose of a kinematic reversal relative to the first embodiment variant, that the self-centering clamping mechanism have a tapered receptacle which is arranged concentrically in the reaming head and is defined by an annular flat face, a tapered spigot which projects coaxially forward beyond the guide shank, is defined by an annular flat face and can be inserted into the tapered receptacle, and a clamping screw which can be screwed from the reaming head into a coaxial internal thread of the guide shank, the reaming head and the guide shank, in the region of their flat faces, in the state free of stress, limiting a defined gage clearance dimension and, in the clamped state, bearing against one another with the tapered receptacle and the supporting elements arranged on the outside in this region being expanded elastically to a guide dimension. The rotary driving between the guide shank on the one hand and the reaming head on the other hand is expediently effected in this case by the reaming head having an internal hexagon arranged between tapered receptacle and annular flat face, while the guide shank has an external hexagon arranged between the tapered spigot and the annular flat face and complementary to the internal hexagon.

The clamping screw is expediently designed as a differential screw screwed into opposing internal threads of the reaming head and of the guide shank.

Tests have shown that the optimum gage clearance dimension lies between 0.01 and 0.06 mm, preferably 0.02 and 0.04 mm, while the taper angle of the tapered spigot and of the tapered receptacle should be 8° to 16°. In order to avoid distortions in the region of the plane-parallel contact, it is important that the clamping screw, in the clamping state, is fastened with a tightening torque of $D=X+d$, in which case $X$ denotes the tightening torque at the instant when the flat faces run against one another and d denotes an additional torque for producing a frictional connection in the order of magnitude of 0.4 to 4 Nm.

The supporting elements are advantageously designed as guide strips. A preferred configuration of the invention provides for the reaming head to have several, preferably four to six, cutting edges distributed over the circumference preferably at unequal spacing, and for the guide shank to have a corresponding number of guide strips distributed over the circumference and running in an axially parallel manner, the guide strips being arranged in the circumferential direction such as to be offset in each case from the spatially associated cutting edges. With these measures, a high surface quality in the bores to be machined can be achieved. A further improvement in this respect is achieved in that the flat face on the reaming-head side and the flat face on the rod side are continuous in the circumferential direction, that in other words no transverse grooves or transverse pins are arranged in this region.

A preferred method of producing a guide shank for the reaming tool according to the invention in accordance with the first embodiment variant provides for the pre-machined guide shank, provided with supporting elements or guide strips and with a front-end tapered receptacle, to be slipped onto a grinding arbor provided with a tapered spigot and a flat face defining the tapered spigot in an annular manner and to be clamped in place on this grinding arbor by means of a central clamping mechanism with the rod-side supporting elements or guide strips being partly expanded radially, and to then be ground on the outside diameter, with a predetermined diameter guide dimension being set, and to be removed again from the grinding arbor. The guide shank to be ground on the outside diameter, with a predetermined gage clearance dimension of preferably 0.01 to 0.06 mm being maintained, is put onto the tapered spigot of the grinding arbor and is tightened up to the stop with a defined clamping force against its flat face. To this end, the guide shank is advantageously clamped in place on the tapered spigot of the grinding arbor with a defined tightening torque by means of a differential screw.

Alternatively, to produce a reaming head for the reaming tool according to the invention in accordance with the second embodiment variant, it is proposed that the pre-machined reaming head, provided with supporting elements or guide strips and with a rear tapered receptacle, is slipped onto a grinding arbor provided with a tapered spigot and a flat face defining the tapered spigot in an annular manner and is clamped in place on this grinding arbor by means of a central clamping mechanism with the reaming-head-side supporting elements or guide strips being partly expanded radially, and is then ground on the outside diameter, with a predetermined diameter guide dimension being set, and is removed again from the grinding arbor. In this case, the reaming head to be ground on the outside diameter, with a predetermined gage clearance dimension of preferably 0.01 to 0.06 mm expediently being maintained, is put onto the tapered spigot of the grinding arbor and is tightened up to the stop with a defined clamping force against its flat face. To this end, the reaming head is advantageously clamped in place on the tapered spigot of the grinding arbor with a defined tightening torque by means of a differential screw. The best repetitive accuracy is achieved if the differential screw, during the clamping operation, is fastened with a tightening torque D=X+d, in which case X denotes the tightening torque at the instant when the flat faces run against one another and d denotes an additional torque of 0.4 to 4 Nm for producing a frictional connection.

BRIEF DESCRIPTION OF THE DRAWINGS

The invention is explained in more detail below with reference to the exemplary embodiments shown schematically in the drawing, in which:

FIG. 1 shows an arrangement for boring a camshaft alley bore with a reaming tool having a long guide shank which can be supported in the pre-machined bores;

FIG. 2 shows, in a longitudinal section, a detail of the reaming tool in the region of the coupling between reaming head and guide shank;

FIG. 3 shows, in a longitudinal section, a detail of the reaming tool in the region of the coupling, modified compared with FIG. 2, between reaming head and guide shank.

DETAILED DESCRIPTION

The reaming tool 10 shown in FIG. 1 is intended for finish-reaming camshaft bearing bores 14 arranged at an axial distance from one another on a cylinder head 12 and in alignment with one another. To achieve the required alignment, the reaming tool 10 has a long guide shank 16 which, by means of guide strips 18 oriented in an axially parallel manner and distributed over the circumference of the guide shank 16, are supported in the respectively pre-machined bores 14 and if need be in a guide bush 20 arranged in a fixed position in the machine. At its machine-side end, the guide shank 16 is provided with a clamping shank 22 for connection to a machine spindle (not shown), which in the exemplary embodiment shown is designed as a hollow shank taper. Also located there is a compensating holder 24, with which alignment differences can be compensated for.

At its front end, the guide shank 16 carries a reaming head 26 which is fitted with a plurality of cutting edges 28 which are at a distance from one another in the circumferential direction. The cutting edges 28 perform a guidance function at their end facing the shank. In principle, it is possible for the cutting edges 28 to merge into guide strips at their shank-side end in the region of the cutting head. The reaming head 26 is designed as a component which is separate from the guide shank 16. As can be seen from FIGS. 2 and 3, the reaming head 26 can be connected to the guide shank 16 by means of a self-centering clamping mechanism. Since a prestress which leads to an elastic deformation is produced during the clamping operation in the region of the clamping mechanism, it is important on account of the stringent accuracy requirement that the supporting elements positioned in the vicinity of the clamping mechanism can be radially expanded during the clamping operation at least partly from a diameter undersize to a predetermined diameter guide dimension.

In the exemplary embodiment shown in FIG. 2, the self-centering clamping mechanism 30 has a tapered receptacle 34 arranged concentrically in the guide shank 16 and defined by an annular flat face 32, a tapered spigot 38 that projects coaxially rearward beyond the reaming head 26 and is defined by an annular flat face 36 for insertion into the tapered receptacle 34, and a clamping screw 40 designed as a differential screw for screwing into opposing internal threads 42, 44 of the reaming head 26 and the guide shank 16. For rotary driving, the guide shank 16 has an internal hexagon 46 arranged between the tapered receptacle 34 and the annular flat face 32, while the reaming head 26 has an external hexagon 48 arranged between the tapered spigot 38 and the annular flat face 36 that is complementary to the internal hexagon 46.

The clamping mechanism shown in FIG. 3 differs from the clamping mechanism according to FIG. 2 merely owing to the fact that the tapered receptacle 34' is arranged at the rear on the reaming head 26 and the tapered spigot 38' is arranged so as to project at the front end on the guide shank 16. Accordingly, the internal hexagon 46' is here arranged on the reaming head and the external hexagon 48' is arranged on the guide shank 16. In both cases, during the clamping operation, the clamping screw 40 is actuated through its bore 50 from the front end of the reaming head 26.

The reaming head 26 and the guide shank 16, in the region of their flat faces 32, 36, in the state free of stress, limit a defined gage clearance dimension a of preferably 0.01 to 0.06 mm, whereas in the clamped state they bear against one another with the tapered receptacle 34, 34' and the guide strips 18 arranged on the outside in this region being expanded elastically to a predetermined guide dimension. The taper angle of the tapered spigot 38, 38' and of the tapered receptacle 34, 34' is about 12° in the exemplary embodiment shown. In order to ensure high repetitive accuracy, it has proved to be especially important that the clamping screw 40 is always tightened with the same tightening torque. The tightening torque in this case depends on the friction behavior of the connecting partners and on the actual gage clearance dimension a. To overcome the gage clearance dimension up to the stop between the flat faces, a tightening torque X is required. There is also an additional torque d for producing a frictional connection on account of internal elastic deformation. The tightening torque D is accordingly obtained as X+d. In this case, d=0.4 to 4 Nm, whereas the tightening torque X, depending on the gage clearance dimension a, may be 3 to 16 Nm.

In order to always obtain the same guide diameter, it is of particular importance that, in the case of the exemplary embodiment according to FIG. 2, the guide shank is clamped in place on a grinding arbor with a tapered spigot and is ground there on the outside diameter in the clamped state with a defined diameter guide dimension being set. Alternatively, in the exemplary embodiment according to FIG. 3, corresponding machining of the reaming head 26 drawn onto the grinding arbor is to be carried out. In order to obtain reproducible results, the clamping conditions are the same as when mounting the reaming head 26 on the guide shank 16.

In summary, the following may be stated: the invention relates to a reaming tool for reaming a plurality of bores 14 of a workpiece 12 which are arranged at an axial distance from one another. The reaming tool has a guide shank 16, which can be clamped in place in a machine spindle and can be supported by means of external supporting elements 18 in prepared bores 14 of the workpiece 12 to be machined, and a reaming head 26 coaxially adjoining the front end of the guide shank 16. In order to permit a simple tool change in the event of wear, it is proposed according to the invention that the reaming head 26 can be connected to the guide shank 16 by means of a self-centering clamping mechanism 30 and that the supporting elements 18 positioned in the vicinity of the clamping mechanism 30 can be radially expanded during the clamping operation at least partly from a diameter undersize to a predetermined diameter guide dimension.

What is claimed is:

1. A reaming tool for reaming a plurality of coaxial bores of a workpiece which are arranged at an axial distance from one another, comprising:
    a guide shank for clamping in place in a machine spindle and supported by external supporting elements in at least one of prepared bores of the workpiece to be machined and in a guide bush; and
    a reaming head coaxially adjoining a front end of the guide shank and including cutting edges,
    wherein the reaming head is connected to the guide shank by a self-centering clamping mechanism, and
    wherein the supporting elements positioned in the vicinity of the clamping mechanism are capable of being radially expanded during the clamping operation at least partly from undersized diameter to a predetermined diameter guide dimension.

2. The reaming tool as claimed in claim 1, wherein the self-centering clamping mechanism comprises 1) a tapered receptacle that is arranged concentrically in the guide shank and having an annular flat face, 2) a tapered spigot which projects coaxially rearward from the reaming head and has an annular flat face for insertion into the tapered receptacle, and 3) a clamping screw capable of being screwed from the reaming head into a coaxial internal thread of the guide shank, the reaming head and the guide shank, in a region of the respective said flat faces, in a state free of stress, limiting a defined gage clearance dimension and, in a prestressed state, bearing against one another with the tapered receptacle and the supporting elements arranged on the outside in the region being expanded elastically to the guide dimension.

3. The reaming tool as claimed in claim 2, wherein the guide shank includes an internal hexagon arranged between the tapered receptacle and the annular flat face, and wherein the reaming head includes an external hexagon arranged between the tapered spigot and the annular flat face that is complementary to the internal hexagon.

4. The reaming tool as claimed in claim 2, wherein the clamping screw comprises a differential screw screwed into opposing internal threads of the reaming head and of the guide shank.

5. The reaming tool as claimed in claim 2, wherein the gage clearance dimension is from 0.01 mm to 0.06 mm.

6. The reaming tool as claimed in claim 2, wherein the taper angle of the tapered spigot and of the tapered receptacle is from 8° to 16°.

7. A The reaming tool as claimed in claim 2, wherein the clamping screw, in the clamping state, is fastened with a tightening torque of $D=X+d$, wherein X denotes the tightening torque at an instant when the flat faces but against one another and d denotes an additional torque of 0.4 Nm to 4 Nm for producing a frictional connection.

8. The reaming tool as claimed in claim 2, wherein the flat faces on the reaming head and the guide shank are continuous in the circumferential direction.

9. The reaming tool as claimed in claim 1, wherein the self-centering clamping mechanism comprises 1) a tapered receptacle that is arranged concentrically in the reaming head and is defined by an annular flat face, 2) a tapered spigot that projects coaxially forward beyond the guide shank and is defined by an annular flat face for insertion into the tapered receptacle, and 3) a clamping screw capable of being screwed from the reaming head into a coaxial internal thread of the guide shank, the reaming head and the guide shank, in a region of the respective said flat faces, in the state free of stress, limiting a defined gage clearance dimension and, in a prestressed state, bearing against one another with the tapered receptacle and the supporting elements arranged on the outside in the region being expanded elastically to the guide dimension.

10. The reaming tool as claimed in claim 9, wherein the reaming head includes an internal hexagon arranged between the tapered receptacle and the annular flat face, and wherein the guide shank includes an external hexagon arranged between the tapered spigot and the annular flat face that is complementary to the internal hexagon.

11. The reaming tool as claimed in claim 1, wherein the supporting elements comprise guide strips.

12. The reaming tool as claimed in claim 11, wherein the reaming head has several cutting edges distributed over a circumference and the guide shank has a corresponding number of said guide strips distributed over the circumference and extending in an axially parallel manner, the guide strips being arranged in the circumferential direction to be offset in each case from the spatially associated cutting edges.

13. A method of producing a guide shank for a reaming tool that comprises the guide shank having a front-end tapered receptacle with an annular flat face and supported by external guide strips for clamping in place in a machine spindle and a reaming head including cutting edges for coaxially being received in the receptacle at a front end of the guide shank, and a self-centering clamping mechanism for connecting the guide shank to the reaming head so that the guide strips positioned in the vicinity of the clamping mechanism are capable of being radially expanded from an undersized diameter to a predetermined diameter dimension when the self-centering clamping mechanism is operated, the method comprising the steps of:
    slipping the guide shank onto a grinding arbor provided with a tapered spigot and an annular flat face;
    clamping the guide shank onto the grinding arbor by applying a defined tightening torque to a differential screw so that the guide strips expand radially;
    grinding an outside diameter of the guide shank to provide the predetermined diameter dimension; and
    removing the guide shank from the grinding arbor.

14. The method as claimed in claim 13, wherein the step of clamping the guide shank onto the grinding arbor by applying a defined tightening torque to the differential screw comprises applying a tightening torque X until the flat faces of the grinding arbor and the guide shank are in contact each other and then applying an additional torque d of 0.4 Nm to 4 Nm to produce a frictional connection.

15. A method of producing a reaming head for a reaming tool that comprises the reaming head having a rear-end tapered receptacle with an annular face and including cutting edges, and a guide shank supported by external guide strips for clamping in place in a machine spindle, the guide shank coaxially being received in the tapered receptacle at a rear end of the reaming head, and a self-centering clamping mechanism for connecting the guide shank to the reaming head so that the guide strips in the vicinity of the clamping mechanism are capable of being radially expanded from an undersized diameter to a predetermined diameter dimension when the self-centering clamping mechanism is operated, the method comprising the steps of:

slipping the reaming head onto a grinding arbor provided with a tapered spigot and an annular flat face;

clamping the reaming head onto the grinding arbor by applying a defined tightening torque to a differential screw so that the guide strips expand radially;

grinding an outside diameter of the reaming head to provide a predetermined diameter dimension; and removing the reaming head from the grinding arbor.

16. The method as claimed in claim 15, wherein the step of clamping the reaming head onto the grinding arbor by applying a defined tightening torque to a differential screw comprises applying a tightening torque X until the flat faces of the grinding arbor and the reaming head contact each other and then applying an additional torque d of 0.4 Nm to 4 Nm to produce a frictional connection.

* * * * *